United States Patent Office 2,978,500
Patented Apr. 4, 1961

2,978,500

MANUFACTURE OF AROMATIC DISULPHONIC ACIDS

Isaac Goodman and Robert Alexander Edington, Harrogate, England, assignors to Imperial Chemical Industries Limited, London, England, a corporation of Great Britain No Drawing. Filed July 18, 1957, Ser. No. 672,577

Claims priority, application Great Britain July 23, 1956

12 Claims. (Cl. 260—505)

This invention relates to the manufacture of aromatic disulphonic acids, bearing the sulphonic groups in the para-positions or positions analogous thereto.

According to the present invention we provide a process for the manufacture of an aromatic disulphonic acid bearing the sulphonic groups in the para-positions or positions analogous thereto, in the form of its alkali metal salt from a salt of an aromatic mono-sulphonic acid, characterized in that the reaction is carried out by heating the alkali metal salt of the aromatic mono-sulphonic acid at an elevated temperature.

The heating may take place at atmospheric or super-atmospheric pressures. The reaction preferably takes place in an inert atmosphere, such as carbon dioxide or argon, although it is not essential that air should be excluded, but when air is present it is desirable that there should be only limited access of air to the reaction vessel.

The reaction will take place in the absence of a catalyst at a temperature of 375° C. or above. However we prefer to operate the process in the presence of a catalyst, as lower operating temperatures can then be used, i.e. temperatures down to the order of 250° C. We have found that substances containing certain heavy metals are very suitable, particularly those containing chromium, mercury, vanadium and silver. In all cases it is desirable not to operate the process at temperatures above about 600° C., otherwise decomposition of the reactants is likely to occur.

The potassium and sodium salts of the aromatic mono-sulphonic acids have been found particularly suitable starting materials and of these we prefer to use the sodium salts as in this case the yield of the desired disulphonic acids is somewhat higher than with the potassium salts and their cost is lower.

It is frequently convenient to isolate the products by liberation of the free disulphonic acids in a crude form. The crude salt products or the free acids may also be converted to chlorides by reaction with for example phosphorous pentachloride or thionyl chloride, or to the corresponding sulphonamides by reaction with, for example, ammonia.

The following Examples 1–14, in which all parts and percentages are by weight, illustrate but do not limit the scope of our invention.

In the following table sodium benzene sulphonate is reacted in an atmosphere of carbon dioxide and the product obtained in the right-hand column is the material obtained by extracting the crude reaction product with water, filtering and removing water from the filtrate by evaporation. The Examples 1–8, illustrating the process of the invention are shown in comparison with Examples A, B, C and D which illustrate that no yields of the desired product are obtained at reaction temperatures below 425° C., in the absence of a catalyst.

| Ex. | Reaction Time (hours) | Reaction Temp. (° C.) | Parts of Reactant | Catalyst Nature | Catalyst Parts | Product Nature | Product Parts |
|---|---|---|---|---|---|---|---|
| A | 24 | 300 | 320 | None | | Unchanged monosulphonate | 300 |
| 1 | 24 | 300 | 320 | K Cr alum | 56 | Pure disodium benzene-p-disulphonate | 240 |
| 2 | 24 | 300 | 320 | VOSO$_4$.H$_2$O | 46 | ___do___ | 240 |
| B | 24 | 350 | 320 | None | | Unchanged monosulphonate | 320 |
| 3 | 24 | 350 | 320 | K Cr alum | 56 | Pure disodium benzene-p-disulphonate | 220 |
| 4 | 24 | 350 | 320 | VOSO$_4$.H$_2$O | 46 | p-Disulphonate+ca. 10% trisulphonate | 200 |
| 5 | 24 | 350 | 320 | HgO | 43 | p-Disulphonate+ca. 10% m-disulphonate | 200 |
| C | 12 | 400 | 680 | None | | Unchanged monosulphonate | 670 |
| 6 | 12 | 400 | 680 | K Cr alum | 57 | Pure disodium benzene-p-disulphonate | 480 |
| 7 | 6 | 425 | 680 | None | | p-Disulphonate+ca. 25% m-disulphonate | 500 |
| D | 24 | 375 | 680 | None | | Unchanged monosulphonate | 670 |
| 8 | 24 | 375 | 680 | Ag$_2$CO$_3$ | 55 | p-Disulphonate+ca. 25% m-disulphonate | 480 |

Example 9

Potassium benzene sulphonate (392 parts) was mixed with lead filings (41 parts) and heated at 375° C. in a closed vessel under 4 atmospheres' pressure of carbon dioxide for 6 hours. The product was extracted with hot water and the filtered extracts were passed through a column of cation exchange resin in the acid form to liberate the sulphonic acid from its salts.

An aliquot sample of the acid gave, by neutralisation followed by treatment with S-benzyl thiuronium chloride, di(S-benzyl thiuronium) benzene-p-disulphonate (melting point, 247° C.) in a yield (50 parts) equivalent to 9% of theoretical of the benzene para-disulphonic acid.

Example 10

Potassium naphthalene-β-sulphonate (492 parts) was intimately mixed with cadmium dust (22 parts), and the mixture heated under 4 atmospheres pressure of carbon dioxide at 425° for 6 hours. Treatment of the product by means of a cation exchange resin as in Example 9 and subsequent reaction with S-benzyl thiuronium chloride gave the bis(S-benzyl thiuronium) salt of naphthalene-2:6-disulphonic acid (300 parts, M. Pt., 274°) in 48% of the theoretical yield for the disproportionation reaction.

Example 11

Sodium naphthalene-β-sulphonate (460 parts) and cadmium dust (22 parts) were mixed and heated together in an atmosphere of carbon dioxide for 6 hours at 425° C. The product was treated with water to separate sodium salts from the insoluble residue, comprising principally naphthalene. The solution of sodium salts was treated with an aqueous solution of bis(S-benzyl thiuronium)chloride, whereby was obtained, after purification, 184 parts of bis(S-benzyl thiuronium) naphthalene-2:6-disulphonate corresponding to a yield of 43% of disodium naphthalene-2:6-disulphonate according to the following equation:

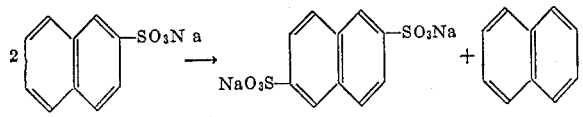

Naphthalene-2:6-disulphonic acid may be liberated from its disodium salt by any convenient means, such as contacting a solution of the salt with a cation exchange resin in the acid form.

*Example 12*

Sodium naphthalene-α-sulphonate (460 parts) was heated at 425° C. for 6 hours in an atmosphere of carbon dioxide. The product was worked up, as in Example 11, to give a 95 parts yield of bis(S-benzyl thiuronium) naphthalene-2:6-disulphonate, corresponding to a 22% yield of naphthalene-2:6-disulphonate, based on the equation:

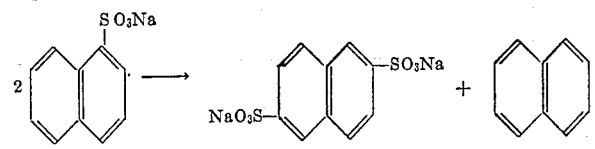

*Example 13*

Sodium diphenyl-4-sulphonate (500 parts) was heated in a sealed vessel for 6 hours at 425° C.; air was not removed from the vessel before sealing. The cooled reaction product smelled strongly of diphenyl, and was extracted with water to isolate sodium sulphonates, the aqueous solution being shaken with chloroform to remove the last traces of diphenyl. Evaporation of the aqueous solution gave a white solid (350 parts) which was essentially disodium diphenyl-4:4'-disulphonate. This was confirmed by conversion to the known disulphenyl chloride M. Pt. 200° (117 parts from 175 parts of disodium salt), and to the bis(S-benzyl thiuronium) salt, melting point, 256° (183 parts from 175 parts of disodium salt).

*Example 14*

Sodium benzene sulphonate (360 parts) was heated in a sealed vessel, from which air had not been removed, for 6 hours at 425° C. The resulting sodium salts were dissolved in water and converted to the free acids by passing the solution through a column containing a cation exchange resin. Evaporation of the resulting solution gave 201 parts of crude benzene-p-disulphonic acid.

Acids formed by the process of the present invention may be further converted by suitable methods into high molecular weight polymers or converted into terephthalic acid or a derivative such as terephthalonitrile, for example by methods such as are described in, H. Schiff: Ber. 1876, 9, 581 (benzene disulphonate).
R. Ebert and V. Merz: Ber. 1876, 9, 592 (naphthalene disulphonate).
O. G. Doebner: Ann. 1874, 172, 116 (diphenyl-4 : 4'-disulphonate).

What we claim is:
1. A process for the manufacture of unsubstituted aromatic disulfonic acids selected from the group consisting of 1:4-benzene disulfonic acid, diphenyl-4:4'-disulfonic acid, and 2:6-naphthalene disulfonic acid which consists in heating an alkali metal salt of an unsubstituted aromatic monosulfonic acid selected from the group consisting of respectively benzene sulfonic acid, diphenyl-4-sulfonic acid, α-naphthalene sulfonic acid, and β-naphthalene sulfonic acid, and at a temperature within the range 375°–600° C.
2. A process for the manufacture of unsubstituted aromatic disulfonic acids selected from the group consisting of 1:4-benzene disulfonic acid, diphenyl-4:4'-disulfonic acid, and 2:6-naphthalene disulfonic acid which consists in heating an alkali metal salt of an unsubstituted aromatic monosulfonic acid selected from the group consisting of respectively benzene sulfonic acid, diphenyl-4-sulfonic acid, α-naphthalene sulfonic acid, and β-naphthalene sulfonic acid, and reaction takes place at a temperature within the range 250°–600° C. and in the presence of a heavy metal catalyst selected from the group consisting of mercury, chromium, vanadium, and silver.
3. A process according to claim 2, wherein the heavy metal is mercury.
4. A process according to claim 2, wherein the heavy metal is chromium.
5. A process according to claim 2, wherein the heavy metal is vanadium.
6. A process according to claim 2, wherein the heavy metal is silver.
7. A process according to claim 1, wherein the alkali metal salt is the sodium salt.
8. A process according to claim 1, wherein the reaction takes place in the absence of air.
9. A process according to claim 8, wherein the reaction takes place in the absence of air and in the presence of an inert gas.
10. A process according to claim 9, wherein the inert gas is carbon dioxide.
11. A process according to claim 9, wherein the inert gas is argon.
12. The process of claim 1, wherein the free acid is obtained from a solution of the alkali metal salt of said aromatic disulphonic acid product by contacting with a cation exchange resin.

References Cited in the file of this patent

UNITED STATES PATENTS

| 2,794,830 | Raecke et al. | June 4, 1957 |
| 2,823,230 | Raecke et al. | Feb. 11, 1958 |
| 2,823,231 | Raecke et al. | Feb. 11, 1958 |

OTHER REFERENCES

Calingaert et al.: "J. Am. Chem. Soc.," vol. 61, pages 2748–54 (1939).